United States Patent
Kreuder et al.

(10) Patent No.: US 9,273,154 B2
(45) Date of Patent: *Mar. 1, 2016

(54) PROCESS FOR PRODUCTION OF HALOBUTYL IONOMERS

(75) Inventors: Carsten Kreuder, Sarnia (CA); Adam Gronowski, Sarnia (CA); John Lovegrove, Sarnia (CA); Hanns-Ingolf Paul, Leverkusen (DE); Rolf Feller, Mettmann (DE); Dana Adkinson, London (CA); Phil Magill, London (CA)

(73) Assignee: LANXESS INTERNATIONAL SA, Granges-Paccot (CH)

( * ) Notice: Subject to any disclaimer, the term of this patent is extended or adjusted under 35 U.S.C. 154(b) by 448 days.

This patent is subject to a terminal disclaimer.

(21) Appl. No.: 13/522,757

(22) PCT Filed: Jan. 17, 2011

(86) PCT No.: PCT/EP2011/050505
§ 371 (c)(1),
(2), (4) Date: Mar. 7, 2013

(87) PCT Pub. No.: WO2011/089083
PCT Pub. Date: Jul. 28, 2011

(65) Prior Publication Data
US 2013/0165582 A1   Jun. 27, 2013

(30) Foreign Application Priority Data
Jan. 20, 2010   (EP) ................................. 10000525

(51) Int. Cl.
*C08F 8/22* (2006.01)
*C08C 19/24* (2006.01)
(Continued)

(52) U.S. Cl.
CPC ................ *C08C 19/24* (2013.01); *C08C 19/14* (2013.01); *C08C 19/22* (2013.01); *C08F 2/06* (2013.01);
(Continued)

(58) Field of Classification Search
CPC .......................................................... C08F 8/22
USPC .......................................................... 524/574
See application file for complete search history.

(56) References Cited

U.S. PATENT DOCUMENTS 3,361,725 A * 1/1968 Parker et al. .................. 526/185
5,021,509 A   6/1991 Keller et al.
(Continued)

FOREIGN PATENT DOCUMENTS

| CA | 1019095 | 10/1977 |
| EP | 0053585 A2 | 6/1982 |
| WO | 2007022618 A1 | 1/2007 |

OTHER PUBLICATIONS

International Search Report from EPO application No. EP20100000525 dated May 28, 2010.
(Continued)

*Primary Examiner* — Bijan Ahvazi
*Assistant Examiner* — Lanee Reuther

(57) ABSTRACT

The invention relates to an energy efficient, environmentally favorable process for the preparation of butyl ionomers that uses a common medium for both solution polymerization and subsequent bromination of butyl rubber. More particularly, the invention relates to a process that employs a common aliphatic medium for both solution polymerization and bromination of butyl rubber in the presence of a brominating agent and optionally for subsequent reaction with at least one nitrogen and/or phosphorus based nucleophile.

15 Claims, 1 Drawing Sheet

(51) Int. Cl.

| | | |
|---|---|---|
| *C08F 8/30* | (2006.01) | |
| *C08C 19/14* | (2006.01) | |
| *C08C 19/22* | (2006.01) | |
| *C08F 2/06* | (2006.01) | |
| *C08F 8/32* | (2006.01) | |
| *C08F 8/40* | (2006.01) | |
| *C08F 210/12* | (2006.01) | |

(52) U.S. Cl.
CPC ... *C08F 8/22* (2013.01); *C08F 8/30* (2013.01); *C08F 8/32* (2013.01); *C08F 8/40* (2013.01); *C08F 210/12* (2013.01)

(56) References Cited

U.S. PATENT DOCUMENTS

| 7,501,460 | B1 | 3/2009 | Weng et al. | |
|---|---|---|---|---|
| 7,514,491 | B2 | 4/2009 | Weng et al. | |
| 8,198,379 | B2 | 6/2012 | Parent et al. | |
| 2008/0207815 | A1* | 8/2008 | Resendes et al. | 524/445 |
| 2009/0182095 | A1 | 7/2009 | Resendes et al. | |

OTHER PUBLICATIONS

Chu, C.Y. and Vukov, R., "Determination of the Structure of Butyl Rubber by NMR Spectroscopy" Macromolecules, 1985, pp. 1423-1430, 18, American Chemical Society.

Parent, J. Scott et al., "Isobutylene-based ionomer composites: siliceous filler reinforcement", Polymer 45, pp. 8091-8096, 2004, Elsevier Ltd.

Morton, Maurice, "Butyl and Halobutyl Rubbers", Rubber Technology, Third Edition, pp. 297-300, 1987, Van Nostrand Reinhold Company, New York.

Parent, J. Scott et al., "Synthesis and Characterization of Isobutylene-Based Ammonium and Phosphonium Bromide Ionomers", Macromolecules, 2004, pp. 7477-7483, 37, American Chemical Society.

* cited by examiner

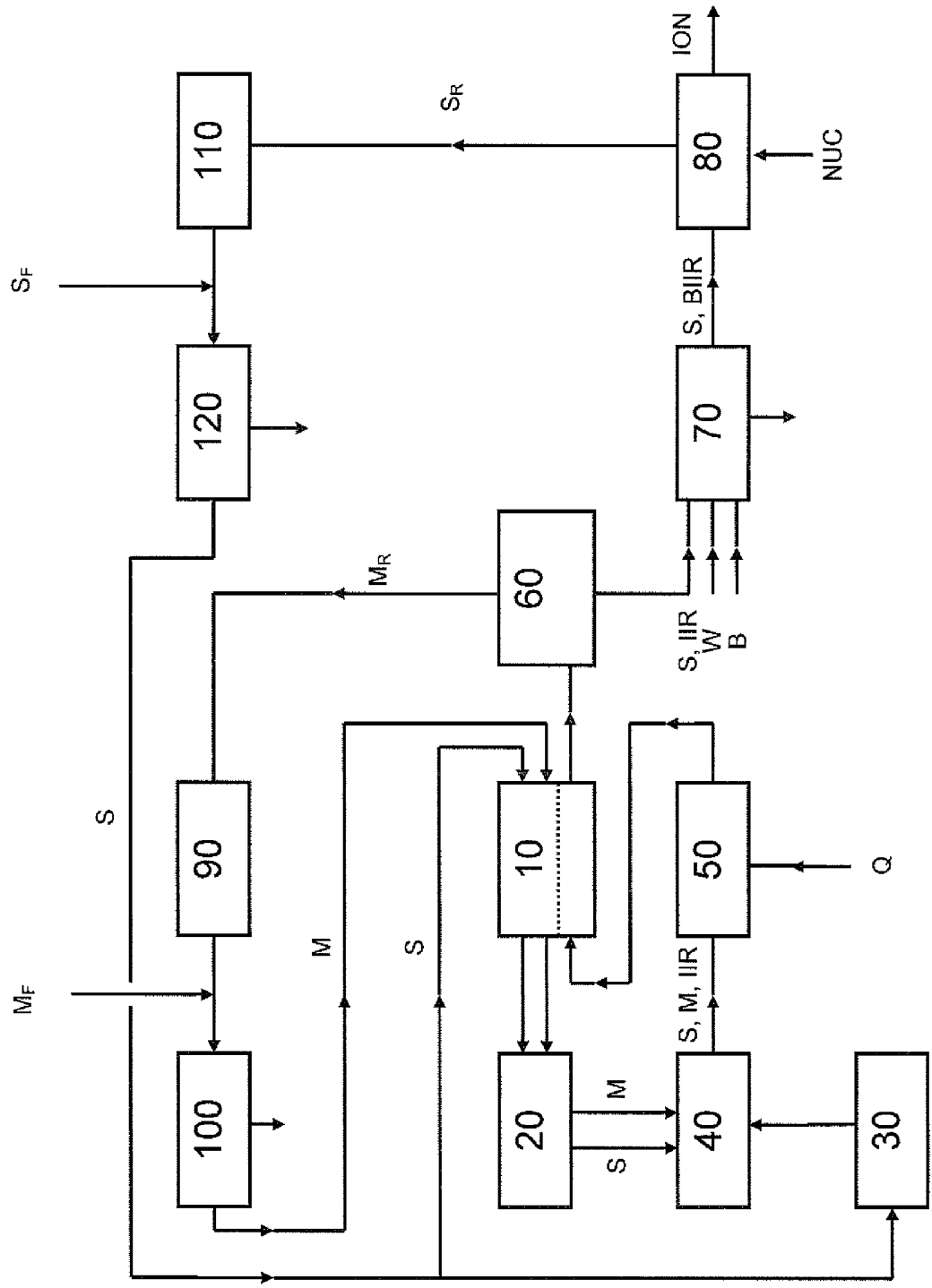

PROCESS FOR PRODUCTION OF HALOBUTYL IONOMERS

FIELD OF THE INVENTION

The invention relates to an energy efficient, environmentally favourable process for the preparation of butyl ionomers that uses a common medium for both solution polymerization and subsequent bromination of butyl rubber. More particularly, the invention relates to a process that employs a common aliphatic medium for both solution polymerization and bromination of butyl rubber in the presence of a brominating agent and optionally for subsequent reaction with at least one nitrogen and/or phosphorus based nucleophile.

BACKGROUND

The term "butyl rubber" as used herein generally means and encompasses co-polymers of $C_4$ to $C_7$ isoolefins, $C_4$ to $C_{14}$ conjugated dienes and optionally other co-polymerizable monomers, if not defined otherwise. The term "bromobutyl rubber" as used herein generally means and encompasses brominated butyl rubbers if not defined otherwise. An illustrative and preferred example of butyl rubber is a rubber obtained by co-polymerization of isoprene and isobutylene, which is herinafter also referred to as IIR. Its brominated analogue is also referred to as BIIR.

Poly(isobutylene-co-isoprene), or IIR, is a synthetic elastomer commonly known as butyl rubber which has been prepared since the 1940's through the random cationic copolymerization of isobutylene with small amounts of isoprene. The resulting commercially available IIR, has a multiolefin content of between 1 and 2 mol %. As a result of its molecular structure, the IIR possesses superior air impermeability, a high loss modulus, oxidative stability and extended fatigue resistance (see Chu, C. Y. and Vukov, R., Macromolecules, 18, 1423-1430, 1985).

It has been shown that treatment of bromobutyl rubber with nitrogen and/or phosphorus based nucleophiles leads to the generation of ionomers with interesting physical and chemical properties, which are dependent inter alia on their initial isoprene content (see EP 1 922 361 A, EP 1 913 077 A, U.S. Pat. No. 7,501,460, U.S. Pat. No. 7,514,491, Parent, J. S.; Liskova, A.; Whitney, R. A.; Parent, J. S.; Liskova, A.; Resendes, R. Polymer 45, 8091-8096, 2004, Parent, J. S.; Penciu, A.; Guillen-CasteUanos, S. A.; Liskova, A.; Whitney, R. A. Macromolecules 37, 7477-7483, 2004.

The bromobutyl rubber used to prepare butyl ionomers is typically prepared in a conventional manner.

In the conventional process for producing bromobutyl rubber, isobutylene and isoprene monomers are first polymerized in a polar halohydrocarbon medium, such as methyl chloride with an aluminum based initiating system, typically either aluminum trichloride ($AlCl_3$) or ethyl aluminum dichloride ($EtAlCl_2$). The butyl rubber does not appreciably dissolve in this polar medium, but is present as suspended particles and so this process is normally referred to as a slurry process. Residual monomers and polymerization medium are then steam stripped from the butyl rubber, before it is dissolved in a bromination medium, typically a non-polar medium such as hexane. The bromination process ultimately produces the final brominated product. The conventional process therefore employs separate polymerization and bromination steps employing two different media. The use of a polar medium for polymerization and a non-polar medium for bromination necessitates intermediate stripping and dissolving steps and is inefficient from an energy point of view.

The step of separating the monomers and methyl chloride from the butyl polymer is conducted before bromination in order to avoid the formation of highly toxic byproducts from the reaction of bromine with residual monomers. The normal boiling points of the components used in the process are: methyl chloride, −24° C.; isobutylene, −7° C.; and, isoprene, 34° C. Any stripping process that removes the heavier of the residual monomers (isoprene) will also remove essentially all of the methyl chloride and isobutylene. The process of removing all of the un-reacted components from the rubber slurry requires significant amounts of energy. The greater molecular weight (and therefore higher boiling point) of the brominated monomers also precludes the removal of these species following the bromination process.

Solution processes for the polymerization of butyl rubber have been known for many years and are practiced commercially in Russia. An example of the solution process is described in CA 1,019,095, which discloses the use of iso-pentane as the preferred polymerization medium. The polymers produced using the above process are non-halogenated. Although bromination could theoretically take place in iso-pentane, the presence of residual monomers (isobutylene and isoprene) would lead to formation of the afore-mentioned undesirable by-products during bromination. The removal of the unreacted monomers is the challenge for such a process and has not been resolved yet. Although it would be desirable to remove the monomers by distillation, the boiling point of iso-pentane (28° C.) is lower than that of the heavier residual isoprene monomer (34° C.), therefore this kind of separation is impossible. Even if pure n-pentane (boiling point 36° C.) were used as the medium, the difference in boiling points would be insufficient to allow effective removal of the isoprene using distillation techniques. As a result, the residual monomers and medium would all have to be stripped together from the butyl rubber, as in the slurry process, with the rubber being subsequently re-dissolved for bromination. This is, in fact, more energy intensive than bromination from the conventional slurry process. The use of iso-pentane as a common medium for producing bromobutyl rubber is therefore not practical using the conventional solution process.

It is known in the art to use hexane i.e. a C6 medium as a polymerization medium in the solution process. However, the viscosity of a polymer solution is strongly dependent upon the viscosity of the medium used. Because the viscosity of a C6 medium is much higher than that of a C5 medium, for a given molecular weight and polymer solids level, the resulting viscosity of the polymer solution is also much higher. This limits polymer solids content to relatively low levels when C6 is used as a solvent, since otherwise the solution becomes too viscous for good heat transfer, pumping and handling. The overall economics of a process depend strongly on the level of polymer solids in the solution or suspension emerging from the polymerization reactor; higher solids levels mean higher conversion and improved economics. In order to make material having a sufficiently high molecular weight for commercial purposes, it is necessary in butyl polymerization to employ relatively low temperatures, often less than −80° C. These low temperatures exacerbate the problem of high solution viscosity and lead to even lower solids levels. In the solution process, it is therefore quite difficult to achieve an economic solids level (conversion) at the desired temperature (molecular weight) when using hexane as a solvent due to high viscosity.

In U.S. Pat. No. 5,021,509 a process is disclosed whereby product from the conventional slurry polymerization process is mixed with hexane to produce a crude rubber solution or cement. The hexane is added to the methyl chloride-rubber slurry after exiting the polymerization reactor in order to dissolve the rubber in hexane while still finely divided and suspended in the methyl chloride/monomer mixture. A distillation process is then used to remove methyl chloride and residual isobutene and isoprene monomers for recycle, leaving just the rubber in a hexane solution ready for halogenation. This so-called "solvent replacement" process still requires that all of the original media left with the rubber after the polymerization stage are removed. The energy requirement is essentially the same as in the conventional process. No common solvent is employed for both polymerization and bromination.

Consequently, there still remains a need for an efficient, environmentally favourable process for the preparation of butyl ionomers.

SUMMARY OF THE INVENTION

There is now provided a process for the preparation of ionomers comprising at least the steps of:
  a) providing a reaction medium comprising
    a common aliphatic medium comprising at least 50 wt.-% of one or more aliphatic hydrocarbons having a boiling point in the range of 45° C. to 80° C. at a pressure of 1013 hPa, and
    a monomer mixture comprising at least one monoolefin monomer, at least one multiolefin monomer and either no or at least one other co-polymerizable monomer in a mass ratio of monomer mixture to common aliphatic medium of from 40:60 to 99:1, preferably from 50:50 to 85:15 and more preferably from 61:39 to 80:20;
  b) polymerizing the monomer mixture within the reaction medium to form a rubber solution comprising a rubber polymer which is at least substantially dissolved in the medium comprising the common aliphatic medium and residual monomers of the monomer mixture;
  c) separating residual monomers of the monomer mixture from the rubber solution to form a separated rubber solution comprising the rubber polymer and the common aliphatic medium,
  d) brominating the rubber polymer in the separated rubber solution to obtain a solution comprising the brominated rubber polymer and the common aliphatic medium,
  e) reacting the brominated rubber polymer obtained in step d) with at least one nitrogen and/or phosphorous containing nucleophile.

The scope of the invention encompasses any possible combination of definitions, parameters and illustrations listed herein whether in general or within areas of preference.

As used herein the term "at least substantially dissolved" means that at least 70 wt.-%, preferably at least 80 wt.-%, more preferably at least 90 wt.-% and even more preferably at least 95 wt.-% of the rubber polymer obtained according to step b) are dissolved in the medium.

In an embodiment of the invention the polymerization according to step b) and the provision of a solution according to step a) is effected using a solution polymerization reactor. Suitable reactors are those known to the skilled in the art and including flow-through polymerization reactors.

Step c) of the process may employ distillation to separate un-reacted residual monomers, i.e. the isoolefin monomers and the multiolefin monomers from the medium. This mitigates the formation of undesirable halogenation byproducts from the unreacted monomers. The process is conducted at a moderate or relatively high ratio of monomers to the common aliphatic medium. Typically, the isoolefin monomers bye a significantly lower viscosity than the common aliphatic medium and therefore, a higher monomer level results in a lower overall viscosity. Overall energy efficiency and raw material utilization of the process is improved by eliminating the need to separate the rubber from a first diluent or solvent used for polymerization, then re-dissolve it in a second solvent for bromination and by recycling bromides resulting from bromination back to a brominating agent. The integrated process according to the invention therefore provides improved energy and raw material efficiency and a reduction in the number of process steps as compared with conventional non-integrated processes for making brominated butyl rubber.

BRIEF DESCRIPTION OF THE DRAWING

Having summarized the invention, preferred embodiments thereof will now be described with reference to FIG. 1 which shows a process flow diagram for a process according to the present invention that employs purification and optional recycle of un-reacted monomers following separation thereof from the polymer solution.

DETAILED DESCRIPTION

Referring to FIG. 1, a solution polymerization reactor 40 is provided with a feed of monomers M, comprising isoprene and isobutylene, and a feed of the common aliphatic medium S via an optional heat exchanger 10, preferably a recuperative heat exchanger, and feed cooler 20. The monomers may either be pre-mixed with the common aliphatic medium or mixed within the polymerization reactor 40. A catalyst solution, comprising a carbocationic initiator-activator system of the type used for butyl polymerizations (e.g. a trivalent metal species, such as aluminium(organo)halides, and a small amount of water), is pre-mixed with the common aliphatic medium S in a catalyst preparation unit 30 and also introduced to the reactor 40. The solution polymerization is then allowed to occur within the polymerization reactor 40. Solution polymerization reactors 40 of a type suitable for use in the present integrated process, along with process control and operating parameters of such reactors, are described, for example, in EP 0 053 585 A, which is herein incorporated by reference. Conversion is allowed to proceed to the desired extent and then a reaction stopping agent Q, for example water or an alcohol such as methanol, is added and mixed into the reactor discharge stream comprising the common aliphatic medium S, un-reacted monomers M and butyl rubber IIR in mixer 50. The resulting polymer solution comprising un-reacted monomers M i.e. isoprene and isobutylene, the common aliphatic medium S and butyl rubber IIR is passed through a recuperative heat exchanger 10 where it is warmed by the incoming feeds to the reactor, while at the same time helping to cool these feeds before they enter the final feeds cooler 20. The warmed polymer solution is then directed to a distillation column 60 for removal of the un-reacted monomers. Once the un-reacted monomers have been separated as recycling stream $M_R$, they exit from the top of the column 60 and the separated polymer solution (S, IIR) exits from the bottom of the column 60 to a solution bromination reactor 70. Additional common aliphatic medium S and/or water W may be provided to the bromination reactor 70 in order to provide the desired conditions for bromination. It is important to note that the same common aliphatic medium used for polymerization accompanies the butyl rubber through the process to bromination and that there is no need to separate the polymer from the solvent prior to bromination. A feed of a bromination agent B (as described hereinafter) is also provided to the bromination reactor 70. The brominated butyl rubber (BIIR) exits the reactor in solution (S, BIIR) and is then converted to the corresponding ionomers, typically after neutralization and washing using reactor 80, by addition of a nitrogen and/or phosphorous containing nucleophile either in solution or after removal of the common aliphatic medium. The ionomer (ION) is then subjected to common finishing and drying procedures. The common aliphatic medium removed either before forming the ionomers or during said finishing step is sent as recycling stream $S_R$ to solvent recovery 110 prior to introduction to solvent purification section 120. Additional common aliphatic medium $S_F$ may be added before purification 120 or afterwards, if the medium has already been pre-purified. The purified common aliphatic medium is recycled back to the recuperative heat exchanger 10 and final feed cooler 20 for re-use in the process. The un-reacted monomers separated from the polymer solution in the distillation column 60 are sent as recycle stream $M_R$ to monomer recovery unit 90 and are then purified in monomer purification section 100 prior to being recycled back to the recuperative heat exchanger 10 and feed cooler 20. Additional fresh monomers $M_F$ may be added either prior to monomer purification 100 or afterwards, if the monomers have been pre-purified. The use of a common aliphatic medium for both polymerization and bromination and optionally even for the conversion to ionomers reduces environmental impact and improves economic performance of the integrated process as compared with conventional approaches.

The description of the process given hereinabove is exemplary and can be applied to all common aliphatic media compositions as well as to all monomer and product compositions mentioned herein.

It is within the scope of the present invention that the composition of the common aliphatic medium may have a slightly varying composition before and after removal of the un-reacted monomers due to different boiling points of its components.

The monomer mixture used to produce the rubber polymer by solution polymerization is not limited to a specific isoolefin, provided that the individual monomers have boiling points lower than 45° C. at 1013 hPa, preferably lower than 40° C. at 1013 hPa, and the monomer mixture has a viscosity less than the common aliphatic medium. However, isoolefins within the range of from 4 to 5 carbon atoms, such as isobutene, 2-methyl-1-butene, 3-methyl-1-butene, 2-methyl-2-butene or mixtures thereof are preferred. The most preferred isoolefin is isobutene.

The monomer mixture is not limited to a specific multiolefin, provided that the individual monomers have boiling points lower than 45° C. at 1013 hPa, preferably lower than 40° C. at 1013 hPa, and the monomer mixture has a viscosity less than the common aliphatic medium. Multiolefins that are known by those skilled in the art to be co-polymerizable with the isoolefins mentioned above can be used.

However, multiolefins comprising dienes, in particular conjugated dienes, within the range of from 4 to 5 carbon atoms, such as isoprene, butadiene or mixtures thereof are preferably used. The most preferred multiolefin is isoprene.

In one embodiment, the monomer mixture for the preparation of the rubber polymer, preferably butyl rubber, may comprise in the range of from 80.0% to 99.5%, preferably 92.0% to 99.5% by weight of at least one, preferably one iso-olefin monomer and in the range of from 0.5% to 20.0%, preferably 0.5% to 8.0% by weight of at least one, preferably one multiolefin monomer. More preferably, the monomer mixture comprises in the range of from 95.0% to 98.5% by weight of at least one, preferably one iso-olefin monomer and in the range of from 1.5% to 5.0% by weight of at least one, preferably one multiolefin monomer. Most preferably, the monomer mixture comprises in the range of from 97.0% to 98.5% by weight of at least one, preferably one isoolefin monomer and in the range of from 1.5% to 3.0% by weight of at least one, preferably one multiolefin monomer.

In a preferred embodiment of the invention the ranges given above apply to monomer mixtures wherein the isoolefin is isobutene and the multiolefin is isoprene.

In one embodiment, the multiolefin content of butyl rubbers produced according to the invention is for example in the range of 0.5 mol % to 20.0 mol %, preferably 0.5 mol % to 8.0 mol %, more preferably in the range of 1.0 mol % to 5.0 mol %, yet more preferably in the range of 1.5 mol % to 5 mol %, even more preferably in the range of 1.8 mol % to 2.2 mol %.

In another embodiment, the multiolefin content of butyl rubbers produced according to the invention is for example preferably in the range of 3.5 mol % to 20.0 mol %, more preferably 3.5 mol % to 6.0 mol % and even more preferably in the range of 3.5 mol % to 5.0 mol %.

One of the ways in which the aforementioned viscosity problems have been overcome is by selecting a high ratio of monomers to solvent in the polymerization step. Although mass ratios of up to 60:40 monomers to aliphatic hydrocarbon solvent have been used in the prior art, in one aspect the present invention utilizes higher ratios, for example from 61:39 to 80:20, preferably from 65:35 to 70:30. The presence of higher monomer levels, which are predominantly C4 compounds and have lower viscosity than the common aliphatic medium, reduces the solution viscosity to tolerable limits and also permits a higher solids level to be achieved during polymerization. Use of higher monomer levels also allows an acceptable molecular weight to be reached at a higher temperature than when lower levels of monomer are employed. The use of higher temperature in turn reduces solution viscosity and permits greater polymer solids level in the solution.

Another one of the ways in which the aforementioned viscosity problems have been overcome is by selecting the common aliphatic medium as a solvent. A solvent having a higher content or consisting of compounds having a boiling point of less than 45° C. or less at 1013 hPa would have a boiling point such close to the monomers that there separation from the solution would result in significant solvent removal.

The use of a solvent having a higher content or consisting of compounds having a boiling point of more than 80° C. at 1013 hPa would cause difficulties in the separation from the rubber after bromination. The solution viscosity provided by use of such solvents is also significantly higher than with the common aliphatic medium, making the solution more difficult to handle and impeding heat transfer in the reactor, even when provided with the high monomer to solvent ratios described above.

In a preferred embodiment of the invention the common aliphatic medium comprises at least 80 wt.-% of one or more aliphatic hydrocarbons having a boiling point in the range of 45° C. to 80° C. at a pressure of 1013 hPa, preferably at least 90 wt.-%, even more preferably at least 95 wt.-% and yet even more preferred at least 97 wt.-%. Aliphatic hydrocarbons having a boiling point in the range of 45° C. to 80° C. at a pressure of 1013 hPa include cyclopentane, 2,2-dimethylbutane, 2,3-dimethylbutane, 2-methylpentane, 3-methylpentane, n-hexane, methylcyclopentane and 2,2-dimethylpentane.

The common aliphatic medium may, for example further comprise other compounds which are at least substantially inert under polymerization conditions such as other aliphatic hydrocarbons like for example heptanes and octanes having a boiling point of more than 80° C. at a pressure of 1013 hPa, propanes, butanes, n-pentane, cyclohexane as well as halohydrocarbons such as methylchloride and other chlorinated aliphatic hydrocarbons which are at least substantially inert under reaction conditions as well as hydrofluorocarbons whereby hydrofluorocarbons are for example those represented by the formula: $C_xH_yF_z$ wherein x is an integer from 1 to 20, alternatively from 1 to preferably from 1 to 3, wherein y and z are integers and at least one.

In another preferred embodiment of the invention the common aliphatic medium is substantially free of halohydrocarbons.

As used herein the term "substantially free" means a content of halohydrocarbons within the common aliphatic medium of less than 2 wt.-%, preferably less than 1 wt.-%, more preferably less than 0.1 wt.-% and even more preferably absence of halohydrocarbons.

The preferred ratio of monomers to a hydrocarbon solvent is not calculable in advance, but can, however, easily determined by very few routine experiments. Although increasing the amount of monomers should reduce solution viscosity, making accurate theoretical predictions of the extent of that reduction is not feasible due in part to the complex effect on viscosity of the interaction of various components of the solution at the concentrations and temperatures employed in the process.

In one embodiment, the process temperature is in the range of −100° C. to −40° C., preferably in the range of −95° C. to −65° C., more preferably in the range of −85° C. to −75° C., yet more preferably in the range of −80° C. to −75° C.

Although higher temperatures are desirable in that energy usage for refrigeration and pumping (due to lower viscosity at higher temperature) are reduced, this generally leads to lower molecular weight polymers that are not as commercially desirable. However, due to the use of high monomer to solvent ratios in the present invention, a reduced but still acceptable molecular weight can be obtained with higher temperatures.

Therefore, in an alternative embodiment, temperatures in the range of −50° C. to lower than −75° C., preferably −55° C. to −72° C., more preferably −59° C. to −70° C., yet more preferably −61° C. to −69° C., are used while still obtaining the desired molecular weight of butyl rubber.

The weight average molecular weight of butyl rubber polymers produced using the processes acoording to the invention, as measured prior to bromination, typically is in the range of 200 to 1000 kg/mol, preferably 200 to 700 kg/mol, more preferably 325 to 650 kg/mol, even more preferably 350 to 600 kg/mol, yet more preferably 375 to 550 kg/mol, even more preferably 400 to 500 kg/mol. If not mentioned otherwise, molecular weights are obtained using gel permeation chromatography in tetrahydrofuran (THF) solution using polystyrene molecular weight standards.

The viscosity of the solution at the discharge of reactor 40 is typically and preferably less than 2000 cP, preferably less than 1500 cP, more preferably less than 1000 cP. A most preferred range of viscosity is from 500 to 1000 cP. If not mentioned otherwise, viscosities are, if not mentioned otherwise, viscosities were measured in a rotational rheometer of cone-plate type (Haake). All given viscosities refer to the extrapolated zero shear viscosity.

The solids content of the solution obtained following polymerization is preferably in the range of from 3 to 25%, more preferably 10 to 20%, even more preferably from 12 to 18%, yet more preferably from 14 to 18%, even more preferably from 14.5 to 18%, still more preferably 15 to 18%, most preferably 16 to 18% by weight. As described previously, higher solids contents are preferred, but entail increased solution viscosity. The higher monomer to solvent ratios used in the present process allow higher solids contents to be achieved than in the past and advantageously also permit use of a common aliphatic medium for both polymerization and bromination.

As used herein the term "solids content" refers to weight percent of the polymer obtained according to step b) i.e. in polymerization and present in the rubber solution.

In step c), un-reacted residual monomers are removed from the solution following polymerization preferably using a distillation process. Distillation processes to separate liquids of different boiling points are well known in the art and are described in, for example, the *Encyclopedia of Chemical Technology*, Kirk Othmer, 4th Edition, pp. 8-311, which is incorporated herein by reference.

The degree of separation is largely dependent upon the number of trays used in the column. An acceptable and preferred level of residual monomers in the solution following separation is less than 20 parts per million by weight. About 40 trays have been found sufficient to achieve this degree of separation. Separation of the common aliphatic medium from the monomers is not as critical and contents of for example up to 10 wt.-% of components of the common aliphatic medium are acceptable in the overhead stream from the distillation process. In a preferred embodiment the contents of components of the common aliphatic medium in the overhead stream from the distillation process are less than 5 wt.-%, more preferably less than 1 wt.-%.

With reference to FIG. 1, the process of the present invention preferably includes purification of the un-reacted monomers separated from the polymerization solution using the distillation column 60. A purification unit 100 may be provided for this purpose; alternatively, purification can take place offsite in a separate purification unit. The purified monomers are normally recycled back into the process and mixed with fresh monomers; however, they may alternatively be utilized in a different process or sold separately. Preferred embodiments of the process include these optional purification and recycling steps in order to achieve advantageous overall process economics.

Purification of monomers may be carried out by passing through adsorbent columns containing suitable molecular sieves or alumina based adsorbent materials. In order to minimize interference with the polymerization reaction, the total concentration of water and substances such as alcohols and other organic oxygenates that act as poisons to the reaction are preferably reduced to less than around 10 parts per million on a weight basis. The proportion of monomers that are available for recycle depends on the degree of conversion obtained during the polymerization process. For example, taking a ratio of monomer to common aliphatic medium of 66:34, if the solids level in the rubber solution produced is 10%, then 85% of the monomers are available to be returned in the recycle stream. If the solids level is increased to 18%, then 73% of the monomers are available for recycle.

Following removal of the un-reacted residual monomers, the butyl polymer is brominated In step d). The brominated butyl rubber is produced using solution phase techniques. A "cement" comprising a solution of the butyl rubber dissolved in the common aliphatic medium used during the polymerization step is treated with a bromination agent which is either used in absence or presence of an additional oxidation agent.

Suitable reoxidizing agents include peroxides and peroxide forming substances as exemplified by the following substances: hydrogen peroxide, sodium chlorate, sodium bromate, sodium hypochlorite or bromite, oxygen, oxides of nitrogen, ozone, urea peroxidate, acids such as pertitanic perzirconic, perchromic, permolybdic, pertungstic, perboric, perphosphoric, perpyrophosphoric, persulfates, perchloric, perchlorate and periodic acids or mixtures of the aforementioned oxidation agents.

Supplemental solvent, for example comprising fresh common aliphatic medium, and/or water may be added to the separated rubber solution in order to form a cement having the desired properties for bromination.

Bromination in the common aliphatic medium used during the polymerization step advantageously saves energy as compared with the conventional slurry process by eliminating the need for separating the polymer from the polymerization medium, then re-dissolving it in a different medium for bromination.

Preferably, the amount of brominating agent is in the range of from 0.1 to 20%, preferably, in the range of 0.1 to 8%, even more preferably from about 0.5% to about 4%, yet even more preferably from about 0.8% to about 3%, even still more preferably from about 1.5% to about 2.5% and most preferably from 1.5 to 2.5% by weight of the polymer.

In another embodiment the quantity of brominating agent is 0.2 to 1.2 times the molar quantity of double bonds contained in the butyl polymer, preferably 0.8 to 1.2 times the molar quantity.

The bromination agent may comprise elemental bromine ($Br_2$), interhalogens such as bromine chloride (BrCl) and/or organo-halide precursors thereto, for example dibromo-dimethyl hydantoin, N-bromosuccinimide, or the like. The most preferred bromination agent comprises bromine. Even more preferably bromine is used as brominating agent.

The bromination process may be operated at a temperature of from 10° C. to 90° C., preferably from 20° C. to 80° C. and the reaction time may be from 1 to 10 minutes, preferably from 1 to 5 minutes. The pressure in the bromination reactor may be from 0.8 to 10 bar.

The amount of bromination during this procedure may be controlled so that the final polymer has the preferred amounts of bromine described hereinabove. The specific mode of attaching the halogen to the polymer is not particularly restricted and those of skill in the art will recognize that modes other than those described above may be used while achieving the benefits of the invention. For additional details and alternative embodiments of solution phase bromination processes, see, for example, Ullmann's Encyclopedia of Industrial Chemistry (Fifth, Completely Revised Edition, Volume A23 1 Editors Elvers, et al.) and/or "Rubber Technology" (Third Edition) by Maurice Morton, Chapter 10 (Van Nostrand Reinhold Company©1987), particularly pp. 297-300, which are incorporated herein by reference.

According to step e) the brominated butyl rubber polymer obtained in step d) is reacted with at least one nitrogen and/or phosphorous containing nucleophile.

After completion of the bromination reaction in step d), the polymer may be recovered by conventional methods, e.g., neutralization with dilute caustic, water washing and removal of solvent such as by steam stripping or precipitation using a lower alcohol such as isopropanol, followed by drying.

Quaternization and ionomer formation can readily accomplished by reactive kneading which can, for example, be performed in an internal mixer, at a temperature and residence time sufficient to carry out the reaction. Alternatively, the reaction may be carried out in solution optionally under elevated pressure and temperature.

Where solution techniques are applied it is preferred to neutralize the rubber solution comprising the bromobutyl rubber polymer and the common aliphatic medium obtained in step d) with an aqueous basic material, for example a diluted aqueous solution of sodium hydroxide, to separate the organic phase comprising the bromobutyl rubber polymer and the common aliphatic medium obtained thereby and to react said solution, optionally after an additional drying step, with at least one nitrogen and/or phosphorous containing nucleophile As used herein the term "nucleophile" denotes a compound having a lone electron pair located on nitrogen or phosphorous which is capable of forming a covalent bond to form phosphonium or ammonium ions.

Preferred nitrogen and/or phosphorous containing nucleophiles are those of formula I

wherein

A denotes nitrogen or phosphorus and $R^1$, $R^2$ and $R^3$ are independently of each other selected from the group consisting of $C_1$-$C_{18}$-alkyl, $C_6$-$C_{15}$-arylalkyl or $C_5$-$C_{14}$-aryl.

$C_1$-$C_{18}$-alkyl denotes a straight-chain, cyclic, branched or unbranched alkyl radical which may optionally be further substituted by hydroxyl or alkoxy groups. The same applies to the alkyl moiety of an $C_6$-$C_{15}$-arylalkyl radical.

$C_5$-$C_{14}$-aryl not only denotes carbocyclic radicals but also heteroaromatic radicals in which zero, one, two or three carbon atoms of each aromatic each ring, but at least one carbon atom in the whole radical, is replaced by a heteroatom selected from the group of nitrogen, sulphur or oxygen.

Alkoxy denotes a straight-chain, cyclic or branched or unbranched alkoxy radical.

Preferred nucleophiles of formula (I) are those wherein two or three of the residues $R^1$, $R^2$ and $R^3$ are identical.

More preferred nucleophiles of formula (I) are: trimethylamine, triethylamine, triisopropylamine, tri-n-butylamine, trimethylphosphine, triethylphosphine, triisopropylphosphine, tri-n-butylphosphine, triphenylphosphine, 2-dimethylaminoethanol, 1-dimethylamino-2-propanol, 2-(isopropylamino)ethanol, 3-dimethylamino-1-propanol, N-methyldiethanolamine, 2-(diethylamino)ethanol, 2-dimethylamino-2-methyl-1-propanol, 2-[2-(dimethylamino) ethoxy]ethanol, 4-(dimethylamino)-1-butanol, N-ethyldiethanolamine, triethanolamine, 3-diethylamino-1-propanol, 3-(diethylamino)-1,2-propanediol, 2-{[2-(dimethylamino) ethyl]methylamino}ethanol, 4-diethylamino-2-butyn-1-ol, 2-(diisopropylamino)ethanol, N-butyldiethanolamine, N-tert-butyldiethanolamine, 2-(methylphenylamino)ethanol, 3-(dimethylamino)benzyl alcohol, 2-[4-(dimethylamino) phenyl]ethanol, 2-(N-ethylanilino)ethanol, N-benzyl-N-methylethanolamine, N-phenyldiethanolamine, 2-(dibutylamino)ethanol, 2-(N-ethyl-N-m-toluidino)ethanol, 2,2'-(4-methylphenylimino)diethanol, tris[2-(2-methoxyethoxy) ethyl]amine, 3-(dibenzylamino)-1-propanol or mixtures of the aforementioned nucleophiles.

The amount of nucleophile reacted with the bromobutyl rubber obtained in step c) is for example in the range from 0.05 to 5 molar equivalents, more preferable from 0.1 to 4 molar equivalents and even more preferably from 0.2 to 3 molar equivalents based on the total molar amount of allylic halide present in the bromobutyl polymer.

In one exemplary embodiment the nucleophile and the bromobutyl polymer can be reacted for about 30 sec to 90 minutes, preferably from 45 sec to 7 minutes and more preferably from 1 min to 5 minutes at temperatures ranging from 80 to 200° C., preferably from 90 to 160° C. and more preferably from 100 to 140° C.

According to the present invention the resulting ionomer could also be a mixture of the polymer-bound ionomeric moiety and allylic halide such that the total molar amount of ionomeric moiety and allylic halide functionality are present in the range of 0.05 to 15.0 mol %, more preferably from 0.2 to 1.0 mol % and even more preferably from 0.5 to 0.8 mol % with residual multiolefin being present in the range from 0.2 to 5.0 mol % and even more preferably from 0.5 to 0.8 mol %.

In a further step f) the ionomer obtained according to step e) may be cured using for example conventional curing systems sulphur, resin or peroxide.

The preferred curing system is sulphur based. A typical sulfur-based curing system comprises: (i) a metal oxide, (ii) elemental sulfur and (iii) at least one sulfur-based accelerator. The 25 use of metal oxides as a component in the curing system is well known in the art. A suitable metal oxide is zinc oxide, which is typically used in the amount of from about 1 to about 10, preferably from about 2 to about 5, parts by weight per hundred parts by weight butyl polymer in the nanocomposite. Elemental sulfur, comprising component (ii) of the preferred curing system is typically used in amounts of from about 0.2 to about 10 parts by 30 weight per hundred parts by weight butyl polymer in the composition. Suitable sulfurbased accelerators (component (iii) of the preferred curing system) are typically used in amounts of from about 0.5 to about 3 parts by weight, per hundred parts by weight butyl polymer in the composition. Non-limiting examples of useful sulfur-based accelerators may be selected from the thiuram sulfides such as tetramethyl thiuram disulfide (TMTD), the thiocarbamates such as zinc dimethyl dithiocarbamate (ZDC) and the thiazyl and benzothiazyl compounds such as mercaptobenzothiazyl disulfide (MBTS). Preferably, the sulphur based accelerator is mercaptobenzothiazyl disulfide.

In another embodiment of the invention curing is effected using peroxide curing agents such as dicumyl peroxide, di-tert.-butyl peroxide, benzoyl peroxide, 2,2'-bis tert.-butylperoxy diisopropylbenzene (Vulcup® 40KE), benzoyl peroxide, 2,5-dimethyl-2,5-di(tert-butylperoxy)-hexyne-3,2,5-dimethyl-2,5-di(benzoylperoxy)hexane, (2,5-bis(tert.-butylperoxy)-2,5-dimethyl hexane and the like.

The peroxide curing agent is suitably used in an amount of 0.2 to 10 parts per hundred parts of rubber (phr), preferably 1 to 6 phr, more preferably about 4 phr.

Vulcanizing co-agents known to be suitable by those skilled in the art can also be used. Suitable co-agents include triallyl isocyanurate (TAIC), commercially available under the trademark DIAK 7 from DuPont or N,N'-m-phenylene dimaleimide known as HVA-2™ (DuPont Dow), triallyl cyanurate (TAC) or liquid polybutadiene known as Ricon™ D 153 (supplied by Ricon Resins). Amounts can be equivalent to the peroxide curative or less.

An antioxidant may also be included in the ionomer, suitably in an amount up to 4 phr, preferably about 2 phr. Examples of suitable antioxidants include p-dicumyl diphenylamine (Naugard® 445), Vulkanox® DDA (a diphenylamine derivative), Vulkanox® ZMB2 (zinc salt of methylmercapto benzimidazole), Vulkanox® HS (polymerized 1,2-dihydro-2,2,4-trimethyl quinoline) and Irganox® 1035 (thiodiethylene bis(3,5-di-tert.-butyl-4-hydroxy) hydrocinnamate or thiodiethylene bis(3-(3,5-di-tert.-butyl-4-hydroxyphenyl)propionate supplied by Ciba-Geigy. Vulkanox is a trademark of Lanxess Inc.

The cured article may contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts that depend, inter alia, on the intended use. The cured article may also contain mineral and/or non-mineral fillers. Conventional amounts are from 0.1 to 50 wt. %, based on the ionomer.

The cured or uncured ionomers may be used as a part of a tire including, but not limited to an inner liner, tread, sidewall, an adhesive, as part of a thermoplastic elastomer, footwear, storage membranes, protective clothing, pharmaceutical stoppers, linings, and barrier coatings.

EXAMPLES

Example 1

Polymerization and Distillation

Key elements of the process described in FIG. 1 have been operated at pilot scale with reactors of 2 liter total capacity running in a continuous mode. Feeds to the reactors were 3.87 kg/h of isobutene, 0.09 kg/h of isoprene and 2.0 kg/h of hexane giving a monomer/common aliphatic medium mass ratio of 66:34. The reaction temperature used was −65° C. and a solution having a solids content of 16 wt % was produced. This material had a weight average molecular weight of about 440 kg/mol and an isoprene content of about 1.7 mol-%. The solution from the reactors was fed to a distillation column with 40 trays and separation of the monomers from the rubber solution was performed. The solution was preheated to 42° C. and a re-boiler was used at the bottom of the column to maintain a bottom temperature of 113° C. A reflux condenser was used to return part of the overhead stream to the top of the column maintaining a temperature there of 36° C. The separation achieved in the column left less than 10 ppm of residual isoprene monomer in the separated rubber solution and about 1% of components of the common aliphatic medium in the overhead monomer stream. The separated monomers were purified, then re-introduced to the solution polymerization reactor. The separated rubber solution in the common aliphatic medium was such that bromination could be accomplished by conventional means with addition of supplemental common aliphatic medium.

The common aliphatic medium used is commercially available and contained 97.5 wt.-% aliphatic hydrocarbons having a boiling point in the range of 45° C. to 80° C. at a pressure of 1013 hPa the rest being aliphatic hydrocarbons having a boiling point of less than 45° C. or more then 80° C. at a pressure of 1013 hPa.

Example 2

Halogenation

The separated rubber solution of Example 1 was halogenated using pilot scale bromination equipment. Supplemental common aliphatic medium in an amount of 10% was added to the separated rubber solution in order to lower the viscosity. A brominated butyl polymer containing 1.6% bromine is produced in the separated rubber solution. The brominated separated rubber solution is then finished using conventional drying and finishing techniques.

Example 3

Preparation of Phosphonium Ionomer

In a 2 L Parr reactor, 100 g bromobutyl rubber of Example 2 is dissolved in 1000 mL of hexanes. To this, 4 g of triphenylphosphine is added and allowed to react for 60 min at a temperature of 100° C. The polymer cement is coagulated in ethanol and the resulting polymer is dried and analyzed by $^1$H and $^{31}$P NMR. A high ionomer content was confirmed.

Example 4

Preparation of Ammonium Ionomer

In a 2 L Parr reactor, 100 g bromobutyl rubber of Example 2 is dissolved in 1000 mL of hexanes. To this, 3.2 g of N,N-dimethylaminoethanol is added and allowed to react for 60 min at a temperature of 100° C. The polymer cement is coagulated in ethanol and the resulting polymer is dried and analyzed by $^1$H NMR. A high ionomer content was confirmed.

The foregoing describes only certain preferred embodiments and other features and aspects of the invention will be evident to persons skilled in the art. Variants or equivalents of described elements that function in the same way may be substituted without affecting the way in which the invention works. All sub-combinations of the described features are intended by the inventor to be encompassed by the following claims.

The invention claimed is:

1. A process for the preparation of ionomers comprising at least the steps of:
   a) providing a reaction medium comprising
      a common aliphatic medium comprising at least 50 wt.-% of one or more aliphatic hydrocarbons having a boiling point of 45° C. to 80° C. at a pressure of 1013 hPa, and
      a monomer mixture comprising at least one monoolefin monomer, at least one multiolefin monomer and either no or at least one other co-polymerizable monomer in a mass ratio of monomer mixture to common aliphatic medium of 40:60 to 99:1;
   b) polymerizing the monomer mixture within the reaction medium to form a rubber solution comprising a rubber polymer which is at least substantially dissolved in the medium comprising the common aliphatic medium and residual monomers of the monomer mixture;
   c) separating residual monomers of the monomer mixture from the rubber solution to form a separated rubber solution comprising the rubber polymer and the common aliphatic medium,
   d) brominating the rubber polymer in the separated rubber solution to obtain a solution comprising the brominated rubber polymer and the common aliphatic medium,
   e) reacting the brominated rubber polymer obtained in step d) with at least one nitrogen and/or phosphorous containing nucleophile.

2. The process according to claim 1, wherein the rubber is a butyl rubber.

3. The process according to claim 2, wherein the weight average molecular weight of butyl rubber as measured prior to bromination is 200 to 1000 kg/mol.

4. The process according to claim 1, wherein the monomer mixture comprises 80.0% to 99.9% by weight of the at least one monoolefin monomer and 0.1% to 20.0% by weight of the at least one multiolefin monomer.

5. The process according to claim 1, wherein the monoolefin monomer is isobutene and the multiolefin monomer is isoprene.

6. The process according to claim 1, wherein the common aliphatic medium comprises at least 80 wt.-% of one or more aliphatic hydrocarbons having a boiling point of 45° C. to 80° C. at a pressure of 1013 hPa.

7. The process according to claim 1, wherein the process temperature of step b) is −100° C. to −40° C.

8. The process according to claim 1, wherein the reaction is performed in a polymerization reactor, and wherein the viscosity of the solution at the discharge of the polymerization reactor is less than 2000 cP.

9. The process according to claim 1, wherein the solids content of the rubber solution obtained following in step b) is 3 to 25%.

10. The process according to claim 1, wherein molecular bromine is used as brominating agent.

11. The process according to claim 1, wherein the amount of brominating agent used is 0.1 to 20% by weight of the rubber.

12. The process according to claim 1, wherein the brominating agent is used in combination with an oxidizing agent.

13. The process according to claim 1, wherein the nitrogen and/or phosphorous containing nucleophiles are those of formula I $$AR^1R^2R^3 \qquad (I),$$

wherein:
   A denotes nitrogen or phosphorus, and
   $R^1$, $R^2$ and $R^3$ are independently of each other selected from the group consisting of $C_1$-$C_{18}$-alkyl, $C_6$-$C_{15}$-arylalkyl, and $C_5$-$C_{14}$-aryl.

14. The process according to claim 1, wherein step a) is accomplished by reactive kneading or carried out in solution.

15. The process according to claim 1, wherein in a further step f) the ionomer is cured.

* * * * *